(12) United States Patent
Takafuji et al.

(10) Patent No.: US 6,501,639 B2
(45) Date of Patent: Dec. 31, 2002

(54) PLASTIC CAPACITOR

(75) Inventors: Yasutane Takafuji, Yokohama (JP); Shinsuke Kato, Fujisawa (JP)

(73) Assignee: Medic Co., Ltd., Shinjuku-ku (JP)

( * ) Notice: Subject to any disclaimer, the term of this patent is extended or adjusted under 35 U.S.C. 154(b) by 0 days.

(21) Appl. No.: 10/000,502

(22) Filed: Dec. 4, 2001

(65) Prior Publication Data

US 2002/0101703 A1 Aug. 1, 2002

(30) Foreign Application Priority Data

Dec. 5, 2000 (JP) .................................. 2000-370650

(51) Int. Cl.$^7$ .............................. H01G 4/06; H01G 4/22
(52) U.S. Cl. ...................................... 361/311; 361/316
(58) Field of Search ................................. 361/311, 312, 361/313, 315, 314, 316

(56) References Cited

U.S. PATENT DOCUMENTS

| | | | | |
|---|---|---|---|---|
| 4,072,532 A | * | 2/1978 | Fletcher et al. | 407/119 |
| 4,229,865 A | * | 10/1980 | Fanning | 219/121.67 |
| 4,870,221 A | * | 9/1989 | Sato et al. | 252/567 |
| 4,902,841 A | * | 2/1990 | Kawakami et al. | 585/25 |

* cited by examiner

*Primary Examiner*—Anthony Dinkins
(74) *Attorney, Agent, or Firm*—Lowe Hauptman Gilman & Berner, LLP

(57) ABSTRACT

The present invention is directed by a capacitor comprising of dielectrics formed of a plastic film in which ceramic particles are dispersed. The plastic film is manufactured by the processes comprising the steps of coating the ceramic particles with wax, dispersing the wax-coated ceramic particles in a molten plastic, and extruding the molten plastic in which ceramic particles are dispersed into a think film.

20 Claims, No Drawings

PLASTIC CAPACITOR

BACKGROUND OF THE INVENTION

1. Field of the Invention

This invention relates to a plastic capacitor, particularly to a compact plastic capacitor with a large capacitance.

2. Description of the Related Art

Electronic products are getting lighter, thinner, and compacter in recent years, while at the same time their performance is rapidly improving. To keep up with these advancements, there have been strong demands for compacter capacitors. In order to make the size of capacitors smaller, however, it is essential to increase the capacitance. This is achieved by increasing the surface area of electrodes, by decreasing the distance between electrodes, and by adopting materials of a high dielectric constant for dielectrics.

Materials used for the dielectrics in capacitors include paper, plastic, and ceramic. Plastic is advantageously used because it can be easily processed into a thin film, has high resistivity, and, due to its low hygroscopic property, has higher insulation resistance than paper.

Ceramic, on the other hand, has a higher dielectric constant than plastic. It has a disadvantage, however, that the overall size of a capacitor using ceramic becomes larger, due to its hard processability into a thin film, than that of a capacitor made from plastic.

SUMMARY OF THE INVENTION

In view of the foregoing, it is an object of the present invention to provide a plastic capacitor that is compact and has large capacitance. This is achieved by using dielectrics formed of plastic with an improved dielectric constant and high processability.

According to one aspect of the present invention, the capacitor is composed of dielectrics formed of a plastic film containing ceramic particles, which have been pre-coated with wax.

According to another aspect of the present invention, said ceramic is selected from the group consisting of titanium oxide, barium titanate, aluminum oxide, magnesium silicate, strontium oxide, zircon, aluminum nitride, carbon nitride, silicon carbide, zinc borosilicate glass, tantalum, and mixtures thereof

DETAILED DESCRIPTION OF THE INVENTION

The capacitor of the present invention includes dielectrics formed of plastic in which fine ceramic particles are dispersed. The ceramic particles are, prior to dispersing in the plastic, pre-coated with wax on the surface by being immersed in the molten wax.

The plastic is selected from the group consisting of polyethylene, polypropylene, polyethylene terephthalate, polystyrene, polycarbonate and polytetrafluoroethylene.

The ceramic is selected from the group consisting of titanium oxide, barium titanate, aluminum oxide, magnesium silicate, strontium oxide, zircon, aluminum nitride, carbon nitride, silicon carbide, zinc borosilicate glass, tantalum, and mixtures thereof, preferably from titanium oxide, barium titanate and aluminum oxide.

In the embodiment of this invention, said ceramic is applied in fine particles whose diameter is practically 0.1–0.4 μm, though it is more desirable that said diameter be smaller.

The wax is selected from the group of petroleum wax such as paraffin wax and microcrystalline wax, polyethylene wax obtained by cracking polyethylene, and natural fat such as fatty acids. The boiling point and the freezing point of the wax are important factors when the wax is selected, because the wax coating on the ceramic particles should be stable at room temperature and when immersed into the molten plastic. The boiling point and the freezing point of the wax depend on the components included, especially on the hydrocarbon length therein. In the present invention, the boiling point of the wax should be higher than the melting temperature of the plastic, practically higher than 200° C. The freezing point should be higher than room temperature.

The objective of coating the surface of the ceramic particles with wax is to increase the affinity of the ceramic to the plastic. Therefore, the wax should be selected considering the properties of the plastic being used. For example, polyethylene wax or petroleum wax is preferably selected for polyethylene and polypropylene, while natural fat such as beeswax or carnauba wax is suitable for polyethylene terephthalate, polystyrene, and polycarbonate.

Coating of the ceramic particles with wax is attained by immersing the particles in the molten wax, and stirring thoroughly the mixture. The temperature of this treatment varies depending on the wax selected and on the plastic selected, but typically is 70–100° C.

Alternatively, coating of the wax is also attained by immersing the particles into the solution prepared by dissolving the wax in an organic solvent having a relatively low boiling point, and by evaporating the solvent later to make the ceramic particles coated evenly with a small amount of the wax.

The ratio of wax to ceramic particles may be extremely small, considering it is sufficient for the wax component to cover only the surface of the particles. Practically, though, a larger amount of wax is used. The amount in weight is 0.1–2.0 parts of wax, preferably 0.3–0.5 parts of wax, for each 100 parts of ceramic particles.

Dispersing the ceramic particles into the plastic is attained by introducing the particles into the plastic that is molten by heating, and then mixing the mixture well.

An alternative method is to first prepare a "master batch" of the plastic that contains a high-concentration of the ceramic particles, and then melt said master batch mixing with the plastic that has no ceramic particles. The "master batch" method is advantageous for facilitating the dispersion of the ceramic particles in the plastic.

The amount of the ceramic particles added to the plastic is preferably 2–15 wt. %, more preferably 5–10 wt. %, in the mixture. If said amount is less than 2 wt. %, it is sometimes insufficient for the effect expected in this invention, and if said amount is more than 15 wt. %, it sometimes causes difficulty in producing a thin film.

The plastic in which ceramic particles are dispersed is then extruded into a thin film to be applied to a capacitor. The thickness of said film is, though it varies depending upon the capacitor to which said film is applied, typically 2–16 μm. The film may be stretched in one or two axial directions.

In the present invention, the ceramic particles are pre-coated with wax to increase said particles' affinity to organic plastic to promote uniform dispersion of said particles in the plastic. When the ceramic particles do not undergo a wax coating prior to being dispersed in the molten plastic, the association of the particles may not be sufficiently broken, which prevents uniform dispersion. The uniform dispersion gives the capacitor a preferable performance, particularly in its capacitance.

All these processes at a high temperature, mentioned above, should be performed under an inert atmosphere in order to prevent the plastic from being oxidized.

The capacitor is manufactured by first piling up the films and electrode foils, such as aluminum or tin, in alternate layers, and then rolling up the resulting multi-layered sheet. Alternatively, it is also attained by first depositing some metal on the film, and then rolling it up.

EXAMPLES

Process for Coating Fine Ceramic Particles 0.3 weight parts of polyethylene wax and 100 weight parts of fine ceramic particles were mixed at 100° C. under a nitrogen atmosphere to form the polyethylene-wax coated ceramic particles, which were then added to the molten polypropylene. The polypropylene in which the ceramic particles were dispersed was then kneaded and extruded to a thin film. By the same way, a polyethylene terephthalate film in which carnauba-wax-coated ceramic particles were dispersed was prepared.

The results of measuring the dielectric constants of the films are shown in Table 1.

TABLE 1

|  |  | Ceramic Particles | | | Dielectric |
| --- | --- | --- | --- | --- | --- |
|  |  | Plastic | Ceramic | Wax | Weight % in the plastic | Constant (room temp., 1 MHz) |
| Example | 1 | Polyethylene | Titanium oxide | Polyethylene wax | 4 | 4.7 |
|  | 2 |  |  | wax | 7 | 5.3 |
|  | 3 |  | Aluminum oxide | Polyethylene wax | 7 | 3.8 |
|  | 4 | Polyethylene terephthalate | Titanium oxide | Carnauba-wax | 7 | 6.1 |
|  | 5 |  | Aluminum oxide | Carnauba-wax | 7 | 4.5 |
| Comparative Example | 6 | Polyethylene | None | None | — | 2.2 |
|  | 7 |  | Titanium oxide | None | 7 | 3.9 |
|  | 8 | Polyethylene terephthalate | None | None | — | 3.1 |
|  | 9 |  | Titanium oxide | None | 7 | 4.8 |

Plastic having a high dielectric constant was obtained by dispersing ceramic particles in it. Further improvement in the dielectric constant was achieved by using the plastic in which ceramic particles pre-coated with wax had been finely dispersed.

The present invention makes it possible to make capacitors smaller, as they contain thin films with dielectric constant and, as a result, to make electronic devices smaller and more lightweight.

The foregoing examples are illustrative of the present invention, but the present invention is not limited to said examples. The invention is defined by the following claims, with equivalents of the claims to be included therein.

What is claimed is:

1. A capacitor, comprising a dielectric formed of a plastic film of a plastic material in which film ceramic particles are dispersed, wherein said plastic film is manufactured by the process comprising the steps of:

coating the ceramic particles with wax;

dispersing the wax-coated ceramic particles in the plastic material when the plastic material is in a molten state; and extruding the molten plastic material, in which the ceramic particles have been dispersed, into said film.

2. The capacitor of claim 1, wherein the ceramic particles comprise a compound selected from the group consisting of titanium oxide, barium titanate, aluminum oxide, magnesium silicate, strontium oxide, zircon, aluminum nitride, carbon nitride, silicon carbide, zinc borosilicate glass, tantalum, and mixtures thereof.

3. The capacitor of claim 1, wherein the wax-coated ceramic particles are dispersed into the plastic material by mixing said wax-coated ceramic particles when said plastic material is at or above the melting point of said plastic material.

4. The capacitor of claim 1, wherein the ceramic particles comprise a compound selected from the group consisting of titanium oxide, barium titanate, magnesium silicate, strontium oxide, zircon, carbon nitride, silicon carbide, zinc borosilicate glass, tantalum, and mixtures thereof.

5. A dielectric for use in a capacitor, said dielectric comprising a film made of a plastic material containing therein dispersed ceramic particles, said ceramic particles being coated with a wax.

6. The dielectric of claim 5, wherein each of said ceramic particles is completely coated with said wax.

7. The dielectric of claim 5, wherein said ceramic particles have a dielectric constant higher than said plastic material.

8. The dielectric of claim 5, wherein said plastic material is selected from the group consisting of polyethylene, polypropylene, polyethylene terephthalate, polystyrene, polycarbonate and polytetrafluoroethylene.

9. The dielectric of claim 5, wherein the ceramic particles comprise a compound selected from the group consisting of titanium oxide, barium titanate, aluminum oxide, magnesium silicate, strontium oxide, zircon, aluminum nitride, carbon nitride, silicon carbide, zinc borosilicate glass, tantalum, and mixtures thereof.

10. The dielectric of claim 5, wherein the ceramic particles comprise a compound selected from the group consisting of titanium oxide, barium titanate, magnesium silicate, strontium oxide, zircon, carbon nitride, silicon carbide, zinc borosilicate glass, tantalum, and mixtures thereof.

11. The dielectric of claim 5, wherein the ceramic particles are fine particles having a diameter of from about 0.1 to about 0.4 $\mu$m.

12. The dielectric of claim 5, wherein said wax enhances the affinity of the ceramic particles to the plastic material and is selected from the group consisting of petroleum wax, polyethylene wax, and natural fat.

13. The dielectric of claim 12, wherein said petroleum wax includes paraffin and microcrystalline wax, said polyethylene wax is obtained by cracking polyethylene, and said natural fat includes fatty acids.

14. The dielectric of claim 5, wherein said wax has a boiling point higher than a melting temperature of the plastic, material, and a freezing point higher than the room temperature.

15. The dielectric of claim 14, wherein the boiling point of said wax is higher than 200° C. and said wax has a melting point of from about 70 to about 100° C.

16. The dielectric of claim 5, wherein a ratio in weight of said wax and said ceramic particles is from about 0.1 to about 2 parts of said wax for each 100 parts of said ceramic particles.

17. The dielectric of claim 5, wherein said ceramic particles constitute from about 2 to about 15% by weight of said film.

18. The dielectric of claim 5, wherein said film has a thickness of from about 2 to about 16 $\mu$m.

19. A capacitor, comprising a multilayer sheet having electrode foils and dielectric films alternately placed one upon another, each of said dielectric films is made of a plastic material containing therein dispersed ceramic particles, said ceramic particles being coated with a wax.

20. The capacitor of claim 19, wherein said sheet is in a rolled state.

* * * * *